(12) United States Patent
Frazier

(10) Patent No.: US 9,949,025 B2
(45) Date of Patent: Apr. 17, 2018

(54) SYSTEMS AND METHODS FOR DETECTING TRANSIENT ACOUSTIC SIGNALS

(71) Applicant: University of Mississippi, University, MS (US)

(72) Inventor: William Garth Frazier, Oxford, MS (US)

(73) Assignee: UNIVERSITY OF MISSISSIPPI, University, MS (US)

(*) Notice: Subject to any disclaimer, the term of this patent is extended or adjusted under 35 U.S.C. 154(b) by 333 days.

(21) Appl. No.: 14/402,609

(22) PCT Filed: May 15, 2013

(86) PCT No.: PCT/US2013/041129
§ 371 (c)(1),
(2) Date: Nov. 20, 2014

(87) PCT Pub. No.: WO2014/025436
PCT Pub. Date: Feb. 13, 2014

(65) Prior Publication Data
US 2015/0139444 A1    May 21, 2015

Related U.S. Application Data

(60) Provisional application No. 61/653,800, filed on May 31, 2012.

(51) Int. Cl.
*H04R 3/00*    (2006.01)
*H04R 1/40*    (2006.01)
(Continued)

(52) U.S. Cl.
CPC .............. *H04R 3/005* (2013.01); *G01H 5/00* (2013.01); *H04R 1/406* (2013.01); *G10L 19/025* (2013.01);
(Continued)

(58) Field of Classification Search
CPC .... H04R 2410/07; H04R 1/083; H04R 1/086; H04R 1/38; H04R 2499/13; H04R 3/007;
(Continued)

(56) References Cited

U.S. PATENT DOCUMENTS 7,171,008 B2 *  1/2007  Elko ................... H04R 3/005
                                         381/122
8,213,634 B1 *  7/2012  Daniel ................ H04R 3/005
                                         381/122
(Continued)

FOREIGN PATENT DOCUMENTS

EP        0219026 A1      4/1987
EP        1840589 A1 * 10/2007  ........... G01S 3/8036
(Continued)

OTHER PUBLICATIONS

Li et al, Acoustic Fall Detection Using a Circular Microphone Array, Sep. 2010.*
(Continued)

*Primary Examiner* — Davetta W Goins
*Assistant Examiner* — Kuassi Ganmavo
(74) *Attorney, Agent, or Firm* — Armstrong Teasdale LLP

(57) ABSTRACT

A two-scale array for detecting wind noise signals and acoustic signals includes a plurality of subarrays each including a plurality of microphones. The subarrays are spaced apart from one another such that the subarrays are configured to detect acoustic signals, and the plurality of microphones in each subarray are located close enough to one another such that wind noise signals are substantially correlated between the microphones in each subarray.

11 Claims, 12 Drawing Sheets

(51) Int. Cl.
*G01H 5/00* (2006.01)
*G10L 25/00* (2013.01)
*G10L 21/0216* (2013.01)
*H04R 1/08* (2006.01)
*G10L 19/025* (2013.01)
*H04R 19/04* (2006.01)

(52) U.S. Cl.
CPC .... *G10L 25/00* (2013.01); *G10L 2021/02166* (2013.01); *H04R 1/083* (2013.01); *H04R 19/04* (2013.01); *H04R 2410/07* (2013.01); *H04R 2430/03* (2013.01)

(58) Field of Classification Search
CPC .... H04R 2430/03; H04R 1/245; H04R 3/005; H04R 3/04; H04R 19/005; H04R 19/04; G10L 2021/02163; G10L 25/00; G10L 2021/02166; G10L 19/025; G10L 21/0208
See application file for complete search history.

(56) References Cited

U.S. PATENT DOCUMENTS

| | | | | |
|---|---|---|---|---|
| 8,374,855 | B2 * | 2/2013 | Hetherington | G10L 21/0208 704/226 |
| 8,781,137 | B1 * | 7/2014 | Goodwin | H04R 3/005 381/94.1 |
| 2002/0191802 | A1 | 12/2002 | Choe et al. | |
| 2004/0161120 | A1 * | 8/2004 | Petersen | H04R 3/005 381/92 |
| 2004/0165736 | A1 * | 8/2004 | Hetherington | G10L 21/0208 381/94.3 |
| 2004/0167777 | A1 * | 8/2004 | Hetherington | G10L 21/0208 704/226 |
| 2005/0225497 | A1 * | 10/2005 | Christensen | H01Q 3/26 343/893 |
| 2007/0030989 | A1 | 2/2007 | Kates | |
| 2007/0256491 | A1 * | 11/2007 | Tillotson | G01N 29/024 73/170.13 |
| 2009/0238369 | A1 * | 9/2009 | Ramakrishnan | H04R 3/005 381/56 |
| 2010/0020986 | A1 | 1/2010 | Nemer et al. | |
| 2010/0280824 | A1 | 11/2010 | Petit et al. | |
| 2010/0316231 | A1 | 12/2010 | Williams | |
| 2012/0140946 | A1 * | 6/2012 | Yen | H04R 1/1083 381/92 |
| 2012/0163622 | A1 * | 6/2012 | Karthik | H04R 3/005 381/92 |
| 2012/0275620 | A1 * | 11/2012 | Matsuo | H04R 3/005 381/92 |
| 2013/0204532 | A1 * | 8/2013 | Nystrom | G01P 5/24 702/3 |
| 2013/0343558 | A1 * | 12/2013 | Fox | H04R 3/002 381/71.14 |

FOREIGN PATENT DOCUMENTS

JP 06269084 A 9/1994
KR 101045627 B1 7/2011

OTHER PUBLICATIONS

Wilson et al, Discrimination of Wind Noise and Sound waves by their contrasting spatial and temporal properties, 2010.*
Shields, Low frequency wind noise correlation in microphone arrays, 2005.*
D. Keith Wilson et al: "Spatial structure of low-frequency wind noise", The Journal of Acoustical Society of America, vol. 11, No. 6, Dec. 1, 2007 (Dec. 1, 2007), pp. EL223-EL228, XP055234954, New York, NY, US ISSN: 0001-4966, DOI: 10.1121/1.2786608.
Moran et al: "Acoustic array tracking performance under moderately complex environmental conditions", Applied Acoustics, Elsevier Publishing, GB, vol. 68, No. 10, Aug. 23, 2007 (Aug. 23, 2007), pp. 1241-1262, XP022211393, ISSN: 0003-682X, DOI: 10.1016/J.APACOUST.2006.08.008.
Douglas Shields F: "Low-frequency wind noise correlation in microphone arrays", The Journal of Acousitcal Society of America, American Institute of Physics for the Acoustical Society of America, New York, NY, US, vol. 117, No. 6, Jun. 1, 2005 (Jun. 1, 2005), pp. 3489-3496, XP012072995, ISSN: 0001-4966, DOI: 10.1121/1.1879252.
Extended European Search Report and Written Opinion issued in connection with corresponding EP Application No. 13827204, dated Dec. 22, 2015.
ISR/WO dated Mar. 11, 2014 for PCT/US2013041129 filed May 15, 2013, 13 pages.

* cited by examiner

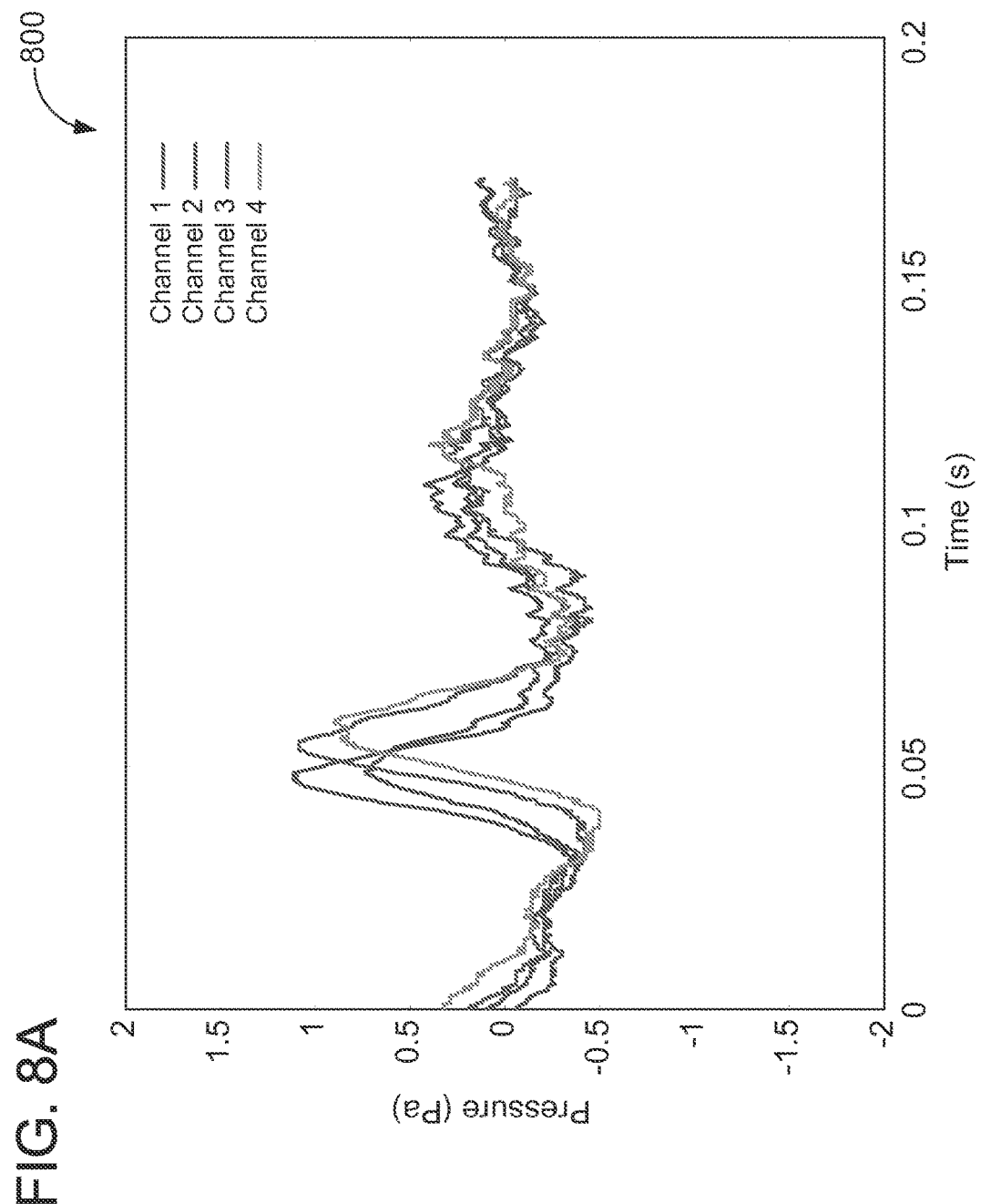

SYSTEMS AND METHODS FOR DETECTING TRANSIENT ACOUSTIC SIGNALS

CROSS-REFERENCE TO RELATED APPLICATIONS

This application is a National Stage Entry of PCT/US2013/041129, filed May 15, 2013, which claims priority to U.S. provisional application No. 61/653,800, filed on May 31, 2012, both of which are incorporated herein by reference in their entirety.

STATEMENT REGARDING FEDERALLY SPONSORED RESEARCH AND DEVELOPMENT

This invention was made with Government support under contract number W15QKN-09-C-0131 awarded by the Department of Defense. The Government has certain rights in this invention.

FIELD OF THE DISCLOSURE

The present disclosure relates generally to detecting acoustic transients in the presence of wind noise.

BACKGROUND

Wind noise is a well-known problem that is often encountered when trying to estimate acoustic signal parameters such as directions of arrival and waveforms. Significant signal-to-noise ratio (SNR) improvements are often obtained by using mechanical windscreens, and the performance of several types and shapes of windscreens have been investigated over the years. In some applications, mechanical windscreens may be adequate for reducing the overall measured level of pressure fluctuations due to wind noise without significantly distorting the acoustic energy. However, in other applications, these techniques may be inadequate, and the correlation among fluctuations due to wind noise can bias the estimates of the direction of arrival of the acoustic energy and the corresponding waveform.

When continuous wave (CW) signals are present, gains in SNR can be achieved by time averaging to improve detection abilities. Further, when detecting the direction of arrival is important, sensor arrays can be exploited to enhance SNR by spatial averaging through beamforming. In spatial averaging, sensors are frequently assumed to be spaced far enough apart so that the wind noise is not correlated from sensor-to-sensor. If this assumption is not met, biased estimates of the signal parameters will be produced.

In applications involving transient acoustic signal detection, however, time averaging is generally ineffective at improving SNR. In such cases, mechanical windscreens and spatial averaging are generally utilized. In order to achieve the desired estimation performance, an appropriate number and spatial configuration of sensors is used. As in continuous wave signal detection, for at least some known beamforming systems, it is important in that the sensors are spaced far enough apart to avoid significant correlation of wind noise. Incidentally, if the wind noise is correlated and its correlation structure is known at the time the transient acoustic signal is acquired, modified beamforming techniques can be used to reduce bias. However, wind noise is frequently highly non-stationary (gusty), and therefore, in at least some known acoustic detection systems, it is relatively difficult to determine the correlation structure of the wind noise before acquiring data.

Further, wind noise problems are often exacerbated at infrasonic frequencies and/or audible frequencies on moving platforms, including ground vehicles and unmanned aerial vehicles. That is, at least some known acoustic microphone systems operating on mobile vehicles suffer from flow noise in the audible range when the vehicles are moving at typical operating speeds. In these applications, mechanical windscreens may provide only limited benefits.

SUMMARY

In one embodiment, a two-scale array for detecting wind noise signals and acoustic signals includes a plurality of subarrays each including a plurality of microphones. The subarrays are spaced apart from one another such that the subarrays are configured to detect acoustic signals, and the plurality of microphones in each subarray are located close enough to one another such that wind noise signals are substantially correlated between the microphones in each subarray.

In another embodiment, a computing device for processing wind noise signals and acoustic signals includes a communication interface configured to receive pressure pulse data from a plurality of microphones. The computing device also includes a memory device configured to store the received pressure pulse data, and a processor configured to fit the pressure pulse data from each microphone to a parametric model that includes a term representing pressure pulses due to wind noise signals and a term representing pressure pulses due to acoustic signals. The processor is also configured to estimate, based on the fitting of the pressure pulse data, a pressure and a velocity of at least one wind noise signal in the pressure pulse data and a pressure and a velocity of at least one acoustic signal in the pressure pulse data.

In still another embodiment, a method for processing acoustic wind noise signals and acoustic signals includes receiving, at a processor, pressure pulse data from a plurality of microphones. The method further includes fitting, using the processor, the pressure pulse data from each microphone to a parametric model that includes a term representing pressure pulses due to wind noise signals and a term representing pressure pulses due to acoustic signals, and estimating, using the processor, based on the fitting of the pressure pulse data, a pressure and a velocity of at least one wind noise signal in the pressure pulse data and a pressure and a velocity of at least one acoustic signal in the pressure pulse data.

In still another embodiment, an assembly kit for a system for detecting wind noise signals and acoustic signals includes a plurality of microphones, and a guide including instructions for arranging the plurality of microphones in a two-scale array that includes a plurality of subarrays of microphones, the plurality of subarrays spaced apart from one another such that the subarrays are configured to detect acoustic signals, and the microphones in each subarray located close enough to one another such that wind noise signals are substantially correlated between the microphones in each subarray. The guide also includes a processing device configured to receive acoustic data from the plurality of microphones and estimate, based on the received acoustic data, a pressure and a velocity of at least one wind noise signal and a pressure and a velocity of at least one acoustic signal.

BRIEF DESCRIPTION OF THE DRAWINGS

FIGS. 8A and 8B are graphs of pressure on four microphones in a subarray;

Corresponding reference characters indicate corresponding parts throughout the drawings.

DETAILED DESCRIPTION OF THE DRAWINGS

The systems and methods described herein utilize a mathematical model to determine wind noise correlation without knowing or directly estimating wind noise correlation before acquiring data. The mathematical model includes terms representing wind noise signals and terms representing acoustic signals. By fitting acquired data to the mathematical model, wind noise signals and acoustic signals are separated from each other, and an estimate of any acoustic signals is produced. Notably, rather than trying to avoid wind noise correlation by increasing spacing between microphones, the systems and methods described herein improve SNR by reducing the spacing between microphones so that wind noise correlation is actually increased. Moreover, the systems and methods described herein may be implemented on mobile platforms, such as vehicles.

Figure 1:
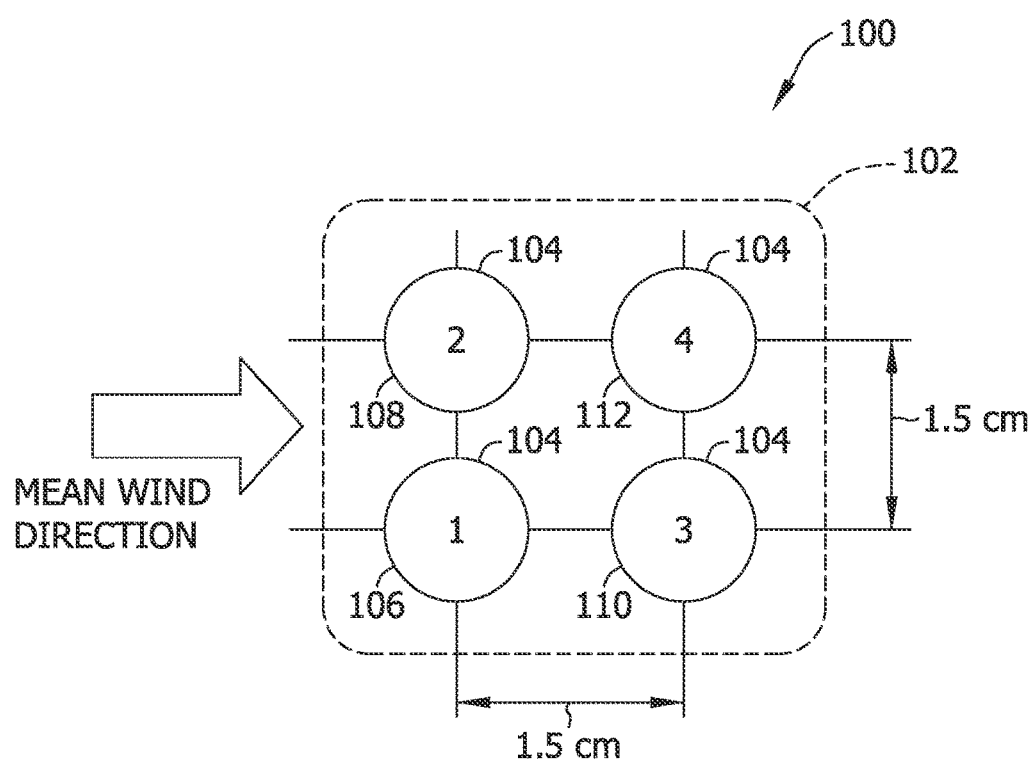
FIG. 1 is a schematic plan view of one embodiment of a system for detecting wind noise signals and acoustic signals.
Figure 2:
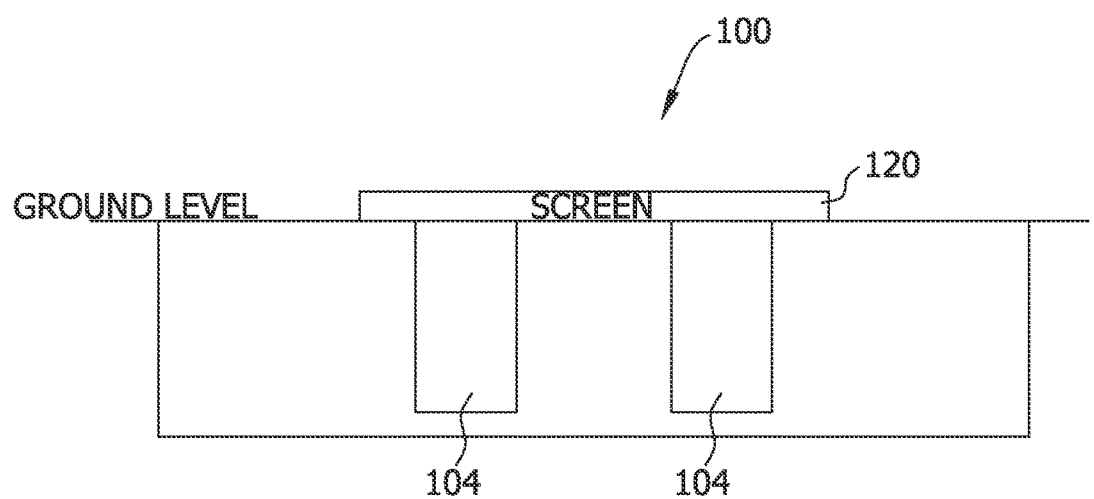
FIG. 2 is a schematic side view of the system shown in FIG. 1.

Referring now to the drawings and in particular to FIGS. 1 and 2, one embodiment of a system for detecting wind noise and acoustic signals is generally indicated at 100. FIG. 1 is a plan view of the system 100, and FIG. 2 is a side view of the system 100. In the embodiment shown in FIGS. 1 and 2, the system 100 includes an array 102 of four microphones 104. Specifically, the array 102 includes a first microphone 106, a second microphone 108, a third microphone 110, and a fourth microphone 112.

In the embodiment shown in FIGS. 1 and 2, the microphones 104 are arranged in the array 102 such that each microphone 104 is located at a corner of a square grid having dimensions of 1.5 centimeters (cm) by 1.5 cm. Notably, the microphones 104 are located close enough to one another such that wind noise is relatively well correlated between them.

As shown in FIG. 2, each microphone 104 is positioned nearly flush to the ground, with a windscreen 120 positioned on top of the microphones 104. Each microphone 104 measures pressure pulses to detect acoustic signals and wind noise. In the embodiment shown in FIGS. 1 and 2, microphones 104 are high-filtered at 20 Hertz (Hz) with a sample rate of 5988 Hz. Alternatively, microphones 104 have any suitable filtering and/or sampling frequency that enables the system 100 to function as described herein. The embodiments specifically described herein are utilized to detect wind noise signals and acoustic signals travelling through air. However, the systems and methods described herein may be utilized to detect wind noise signals and acoustic signals in any fluid medium. For example, in some embodiments, the systems and methods described herein are utilized to detect wind noise signals and acoustic signals travelling through water.

Under Taylor's frozen turbulence approximation, it is assumed that on sufficiently short time scales relative to harmonic frequency, the spatial distribution of turbulence (and thus its pressures distribution) remains constant when transported downstream at an average speed. Further, Taylor's frozen turbulence approximation predicts that at longer wavelengths, turbulence will be relatively well correlated both along the flow and transverse to the flow, while at shorter wavelengths, turbulence will be relatively well correlated along the flow only.

To mathematically model correlated wind noise, Taylor's frozen turbulence approximation can be applied to wind noise signals measured by system 100. That is, under Taylor's frozen turbulence approximation, if the wind is traveling along the mean wind direction shown in FIG. 1, the same pressure pulses due to wind noise measured at the first microphone 106 will be measured at the third microphone 110 after a delay period equal to the time it takes a particular pulse of wind to travel from first the microphone 106 downstream to the third microphone 110. Since the microphones 104 are located sufficiently close to one another, Taylor's frozen turbulence approximation is relatively accurate.

Figure 3:
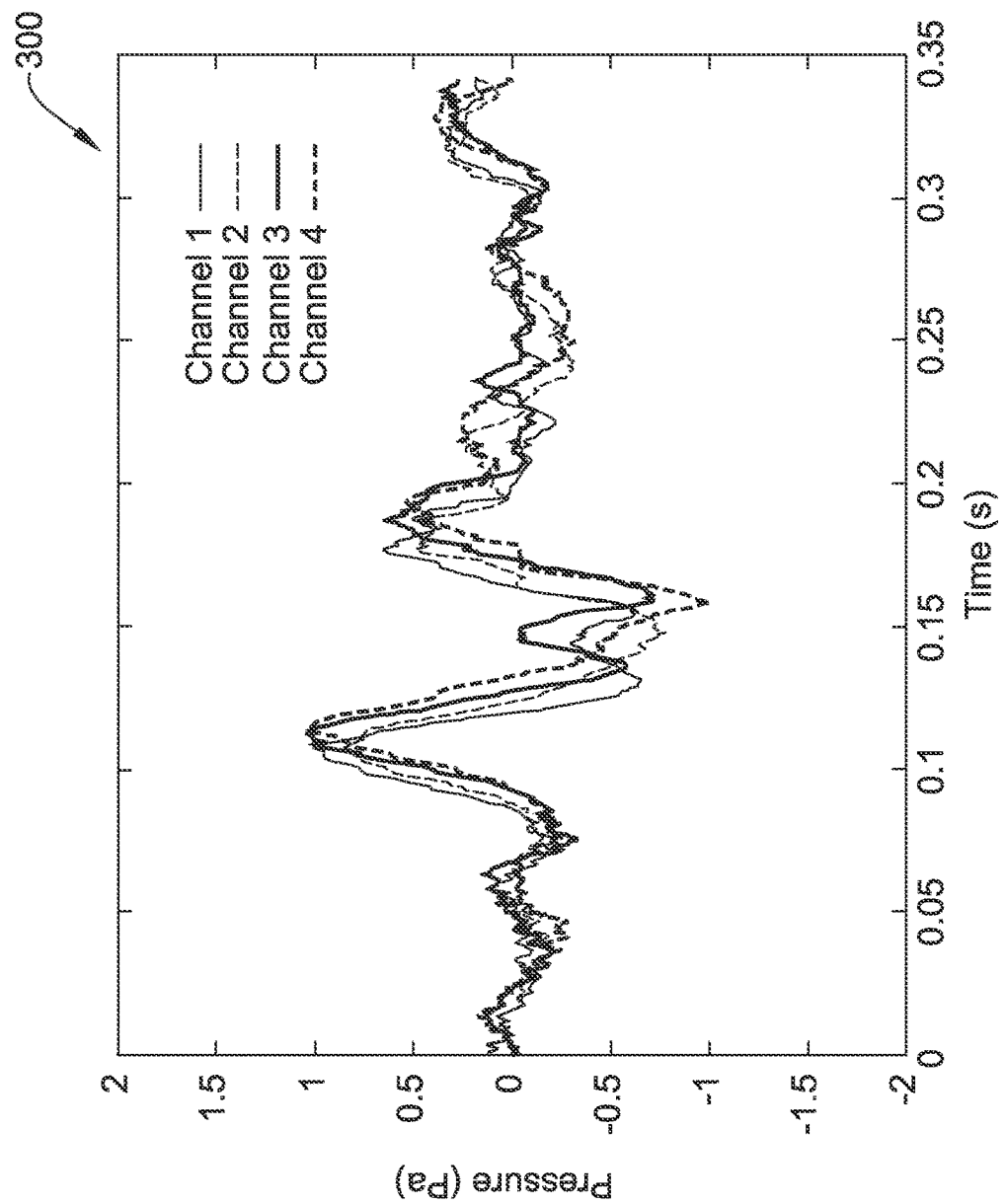
FIG. 3 is a graph of wind noise signals recorded using the system shown in FIGS. 1 and 2.

FIG. 3 is a graph 300 of wind noise signals recorded using the system 100 shown in FIGS. 1 and 2. Graph 300 plots time in seconds (s) versus pressure in Pascals (Pa). Channels 1, 2, 3, and 4 correspond to the first microphone 106, the second microphone 108, the third microphone 110, and the fourth microphone 112, respectively. Consistent with Taylor's approximation, at longer wavelengths, all four microphones 104 in the array 102 are relatively well correlated. Further, at shorter wavelengths, wavelength fluctuations are less correlated perpendicular to the flow (i.e., between the first microphone 106 and the second microphone 108, and between the third microphone 110 and the fourth microphone 112), but remain correlated along the flow (i.e., between the first microphone 106 and the third microphone 110, and between the second microphone 108 and the fourth microphone 112).

Figure 4:
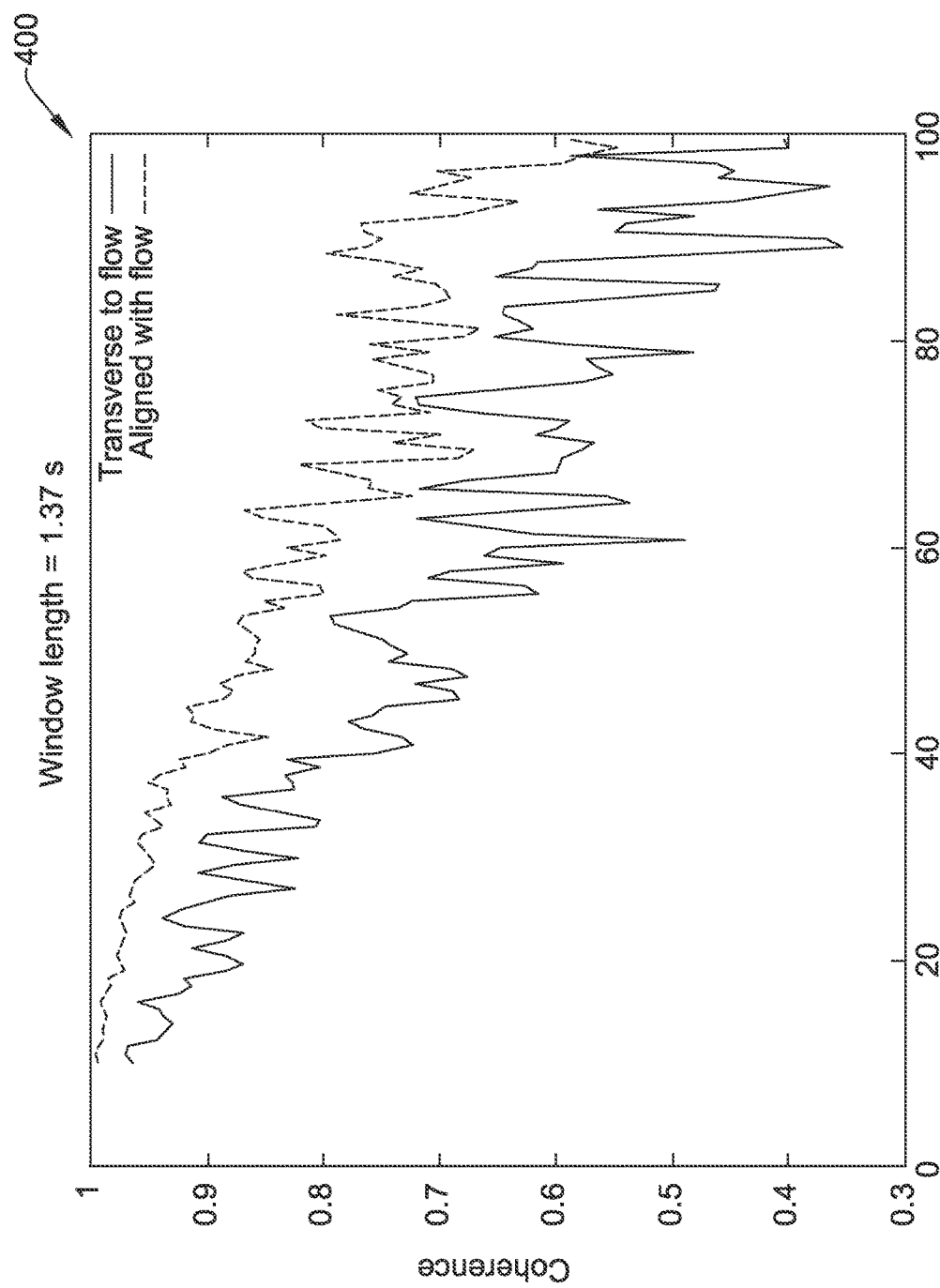
FIG. 4 is a graph of coherence of the wind noise signals recorded using the system shown in FIGS. 1 and 2.

FIG. 4 is a graph 400 illustrating the coherence of the wind noise recorded over a time period of 1.37 seconds using the system 100 shown in FIGS. 1 and 2. Specifically, graph 400 plots frequency in Hz versus coherence. As shown in FIG. 4, and as explained above, at longer wavelengths (i.e., lower frequencies), the measured wind noise is well correlated between pairs of microphones 104 oriented along the flow and between pairs of microphones 104 oriented transverse to the flow. Further, at shorter wavelengths (i.e., higher frequencies), the measured wind noise is better correlated between pairs of microphones oriented along the flow than between pairs of microphones oriented transverse to the flow.

To mathematically model correlated wind noise, the embodiments described herein utilize a plane-wave like model based on Taylor's frozen turbulence approximation, in which a plane normal to the direction of mean flow has a variable pressure distribution. The model accounts not only accounts for pressure fluctuations in time along the flow, but also pressure fluctuations transverse to the flow.

Figure 5:
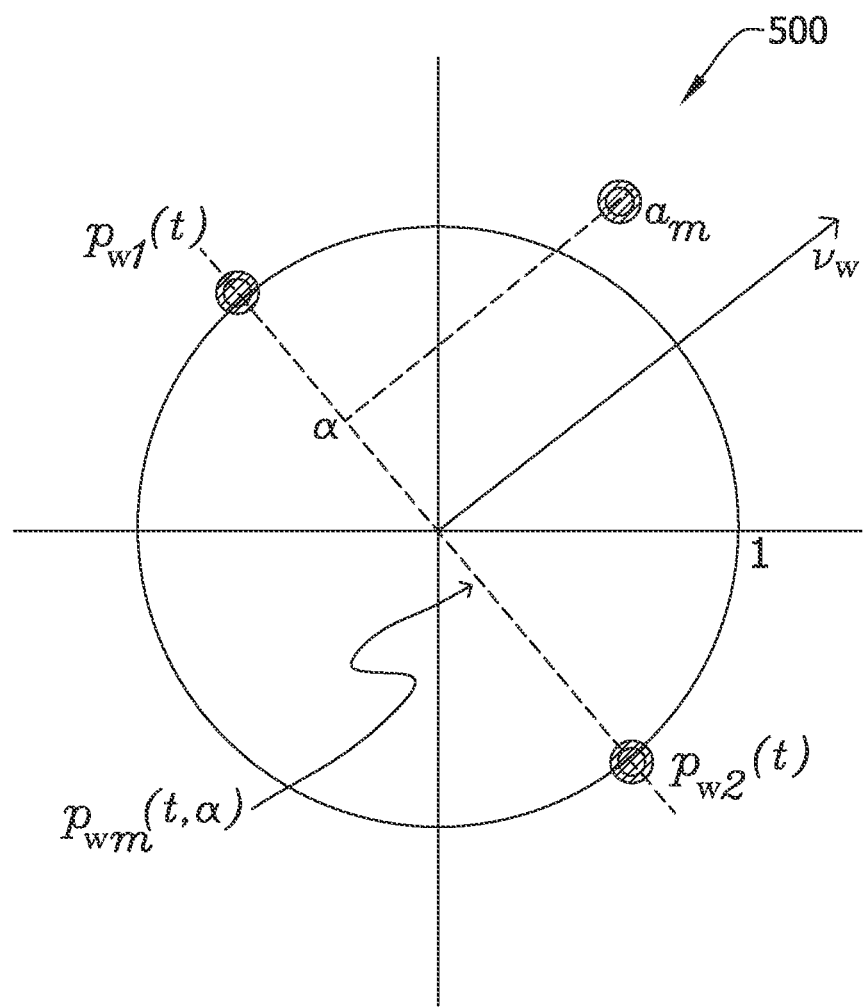
FIG. 5 is a schematic diagram illustrating a two-dimensional wind noise mathematical model.

FIG. 5 is a schematic diagram 500 illustrating a two-dimensional mathematical model utilized in the embodiments described herein. In the diagram 500, $v_w$ is a vector designating the mean direction and speed of the wind, $p_{w1}(t)$ is a pressure signal at radius of one unit (at −1) from the origin lying on a line perpendicular to the flow, $p_{w2}(t)$ is a pressure signal at radius of one unit (at 1) from the origin lying on a line perpendicular to the flow, and $a_m$ is the position vector of a microphone m.

The pressure fluctuation due to the wind anywhere along the line perpendicular to the flow can be expressed as in Equation 1:

$$p_{wm}(t, \alpha) = \left(\frac{1-\alpha}{2}\right)p_{w1}(t-\xi) + \left(\frac{1+\alpha}{2}\right)p_{w2}(t-\xi) \quad (1)$$

where $\alpha = u^T_w R a_m$, $$u = \frac{v_w}{\|v_w\|_2}$$

is a unit vector in the direction of the mean flow, $u^T$ is the transpose of vector u, $$R = \begin{bmatrix} 0 & 1 \\ -1 & 0 \end{bmatrix}, \text{ and } \xi = \frac{v_w^T a_m}{v_w^T v_w}$$

is a time delay (relative to the origin) of the arrival of the mean flow at the microphone.

Accordingly, the model allows for variation perpendicular to the flow as well as along the flow. While the two-dimensional model illustrated in FIG. 5 utilizes a two-node linear finite element, using more finite elements may provide for more flexibility, but may also risk over-parameterization of the wind noise. Further, the systems and methods described herein may be implemented using mathematical models other than Equation 1 to model pressure fluctuations from wind noise.

To accurately detect acoustic signals, the mathematical representation of the wind noise in Equation 1 can be combined with a mathematical representation of acoustic signals to form a mathematical model that can be utilized to separate locally correlated wind signals from measured acoustic signals. Assuming that measured acoustic signals are the result of the presence of plane waves, the pressure pulses due to acoustic signals can be expressed as in Equation 2:

$$p_{aim}(t) = p_{ai}(t - \tau_{im}) \quad (2)$$

where $p_{aim}(t)$ is the pressure due to acoustic signal i measured at position vector $a_m$ at microphone m, $$\tau_{im} = \frac{a_m^T v_{ai}}{v_{ai}^T v_{ai}}$$

is the time delay of acoustic signal i at microphone m with respect to the origin, and $v_{ai}$ is a vector pointing in the direction of travel of the plane wave with length equal to the local speed of sound. Spherical waves can be represented similarly if the application warrants it.

Assuming that pressure measured at each microphone is due to a sum of correlated wind noise pressure pulses (as expressed in Equation 1), acoustic pressure pulses (as expressed in Equation 2), and uncorrelated additive noise $\epsilon_m$, the complete parametric model for the measured pressure $\tilde{p}_m$ at microphone m can be expressed as in Equation 3:

$$\tilde{p}_m(t) = p_{wm}(t, \alpha) + \sum_{i=1}^{N} p_{ai}(t - \tau_{im}) + \varepsilon_m(t) \quad (3)$$

where the number of acoustic plane waves present is equal to N.

Accordingly, using the parametric model of Equation 3, a processing device can be used to separate the correlated wind noise signals from the acoustic signals, and accordingly, accurately detect the acoustic signals. Although the systems and methods described herein utilize the wind noise model illustrated in FIG. 5 one embodiment, it will be appreciated that the systems and methods described herein may be implemented using other mathematical models of wind noise.

Figure 6:
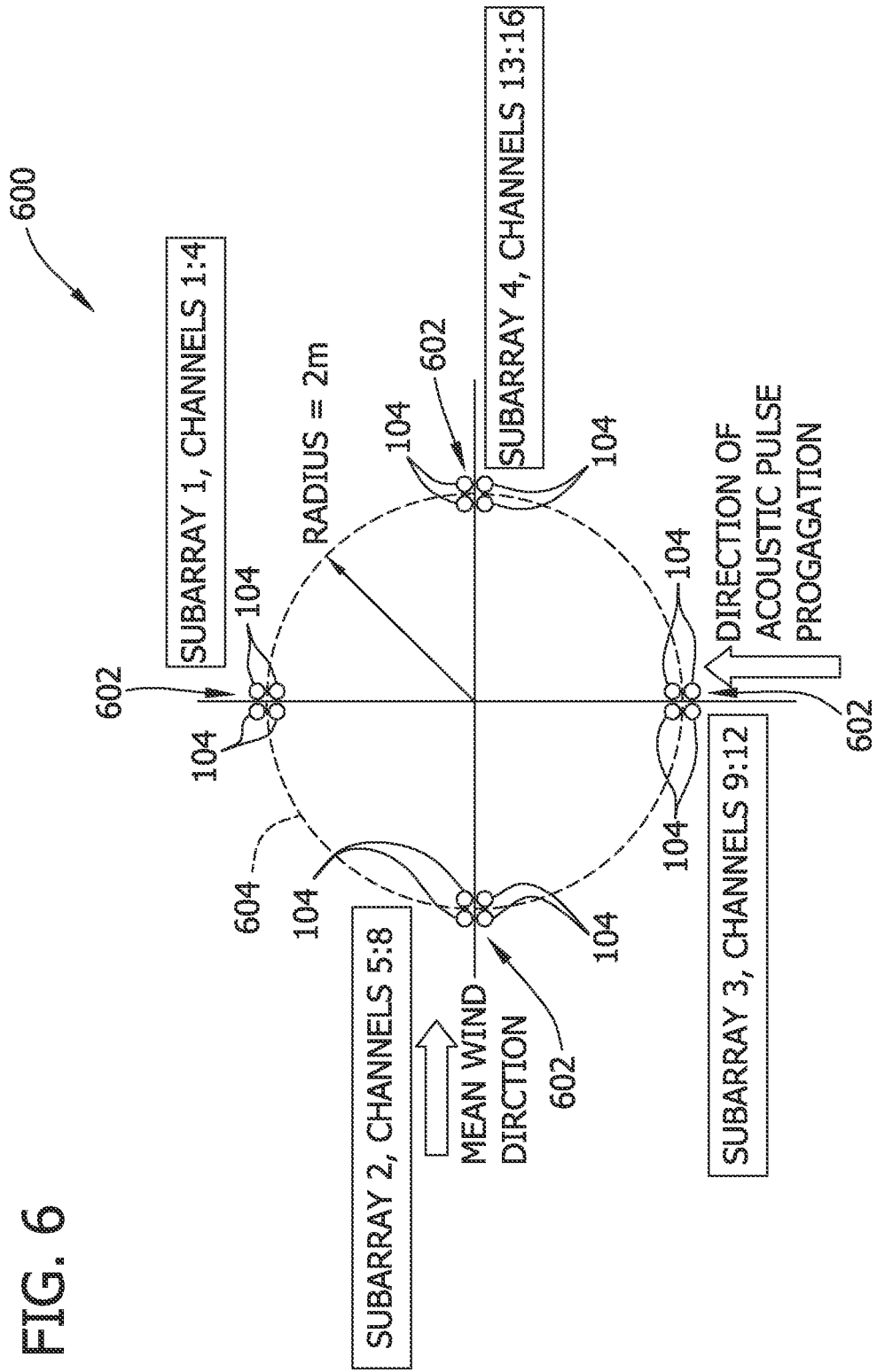
FIG. 6 is a schematic diagram of one embodiment of a two-scale array for detecting wind noise signals and acoustic signals.

FIG. 6 is a schematic diagram of one embodiment of an array 600 for detecting wind noise signals and acoustic signals. The array 600 includes four subarrays 602. Each subarray 602 includes four microphones 104 in the configuration shown in FIG. 1. Accordingly, the array 600 includes sixteen microphones 104 each detecting and measuring pressure pulses on one of sixteen respective channels.

In the embodiment shown in FIG. 6, subarrays 602 are spaced at regular intervals along the circumference of a circle 604. Alternatively, subarrays 602 may be in any configuration that enables array 600 to function as described herein. In the embodiment shown in FIG. 6, the circle 604 has a radius of 2 meters (m). Alternatively, the circle 604 may have any radius that enables array 600 to function as described herein.

Notably, in the array 600, the microphones 104 in each subarray 602 are located close enough to one another such that wind noise signals are well correlated between the microphones 104. However, for acoustic signals having a wavelength in the audible and/or infrasonic range, the scale of each subarray 602 is generally too small to accurately detect such acoustic signals. Accordingly, subarrays 602 are located far enough away from each other to suitably detect acoustic signals. Accordingly, as shown in FIG. 6, array 600 is a two-scale array, in which the spacing between microphones 104 in each subarray 602 is suitable for measuring correlated wind noise signals, and the spacing between subarrays 602 is suitable for measuring acoustic signals.

Figure 7:
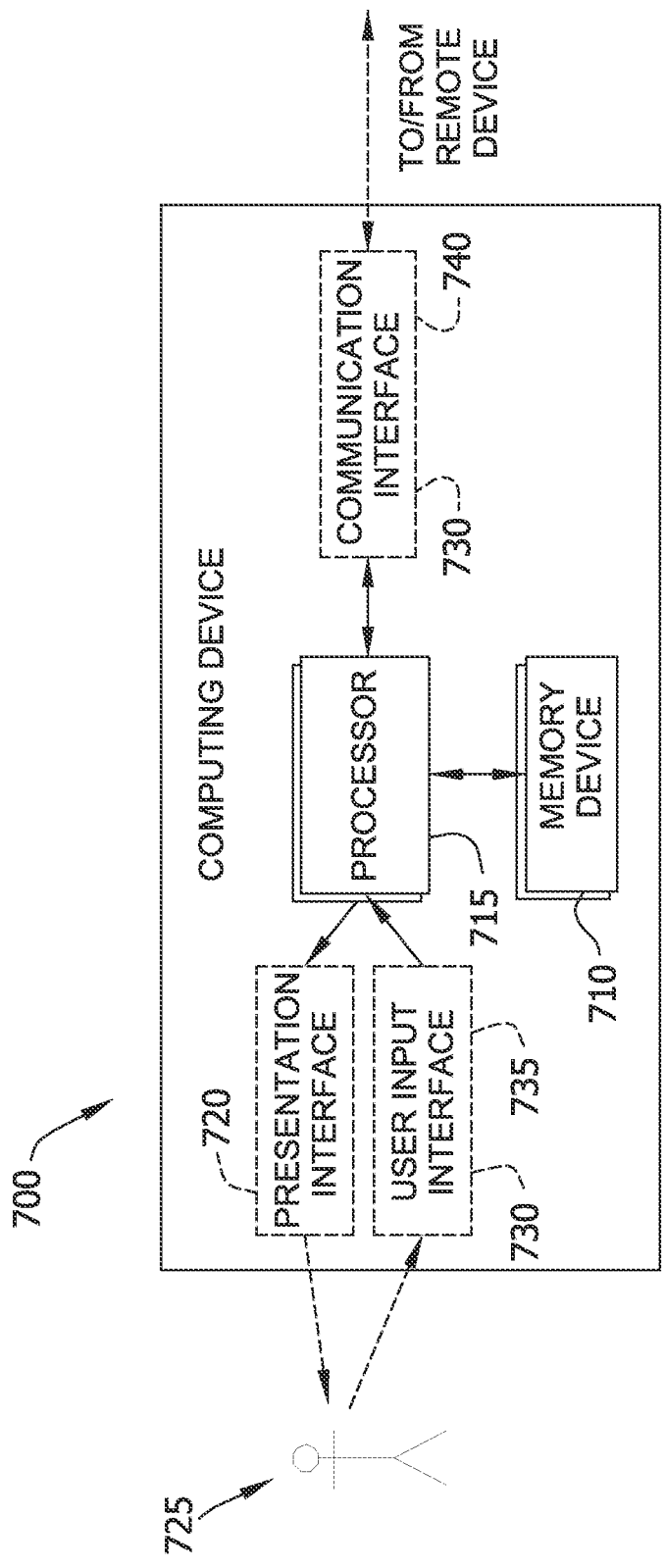
FIG. 7 is a block diagram of one embodiment of a computing device that may be used to process the data acquired by the two-scale array shown in FIG. 6.

FIG. 7 is a block diagram of one embodiment of a computing device 700 that may be used to process the data acquired by the microphones 104 in the array 600 (both shown in FIG. 6). Computing device 700 includes at least one memory device 710 and a processor 715 that is coupled to the memory device 710 for executing instructions. In some embodiments, executable instructions are stored in the memory device 710. The computing device 700 performs one or more operations described herein by programming the processor 715. For example, the processor 715 may be programmed by encoding an operation as one or more executable instructions and by providing the executable instructions in the memory device 710.

The processor 715 may include one or more processing units (e.g., in a multi-core configuration). Further, the processor 715 may be implemented using one or more heterogeneous processor systems in which a main processor is present with secondary processors on a single chip. As another illustrative example, the processor 715 may be a symmetric multi-processor system containing multiple processors of the same type. Further, the processor 715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

The memory device 710 is one or more devices that enable information such as executable instructions and/or other data to be stored and retrieved. The memory device 710 may include one or more computer readable media, such as, without limitation, dynamic random access memory (DRAM), static random access memory (SRAM), a solid state disk, and/or a hard disk. The memory device 710 may be configured to store, without limitation, application source code, application object code, source code portions of interest, object code portions of interest, configuration data, execution events and/or any other type of data. For example, in one embodiment, the memory device 210 stores data that includes the pressure pulses measured by the microphones 104 in the array 600.

The computing device 700 includes a presentation interface 720 that is coupled to the processor 715. The presentation interface 720 presents information to a user 725. For example, the presentation interface 720 may include a display adapter (not shown) that may be coupled to a display device, such as a cathode ray tube (CRT), a liquid crystal display (LCD), an organic LED (OLED) display, and/or an "electronic ink" display. In some embodiments, the presentation interface 720 includes one or more display devices.

In the embodiment shown in FIG. 7, the computing device 700 includes a user input interface 735. In the exemplary embodiment, the user input interface 735 is coupled to the processor 715 and receives input from the user 725. The user input interface 735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of the presentation interface 720 and the user input interface 735.

The computing device 700 includes a communication interface 740 coupled to the processor 715 in the exemplary embodiment. The communication interface 740 communicates with one or more remote devices, such as the microphones 104 in the two-scale array 600. To communicate with remote devices, the communication interface 740 may include, for example, a wired network adapter, a wireless network adapter, and/or a mobile telecommunications adapter.

In one embodiment, pressure pulse data is received from the microphones 104 in the array 600 by communication interface 740 and stored in the memory device 710. The processor 715 processes the pressure pulse data as described herein.

Using the computing device 700, Equation 3 is fit to the data acquired from each of the sixteen microphones 104. In one embodiment, the processor 715 fits all sixteen sets of pressure data (one from each microphone 104) to sixteen instances of Equation 3 (one for each microphone 104) at once to estimate the various parameters in Equation 3. Alternatively, the processor 715 can fit the data for each subarray 602 separately, and subsequently combine (e.g., average) the results for each subarray 602 to determine estimates for the various parameters.

Notably, if the uncorrelative additive noise signals $\epsilon_m$ in Equation 3 are assumed to be normally distributed over the array 600, as well as white noise and uncorrelated, then least-squared error minimization over the parameters of the model given by Equation 3 is equivalent to maximum likelihood estimation.

In Equation 3, the parameters to be determined from fitting the data are the velocity vectors for the wind noise and each acoustic signal $\{v_w; v_{ai}, i=1, \ldots, N\}$ and the pressure signals for the wind noise and each acoustic signal $\{p_{w1}, p_{w2}; p_{ai}, i=1, \ldots, N\}$. By supplying the measured signal from each microphone 104 to the computing device 700, the processor 715 is able to fit Equation 3 to the data to estimate the velocity vectors and pressure signals for the wind noise and each acoustic signal.

In at least some embodiments, using processor 715, the pressure data measured by the microphones 104 in array 600 is windowed, zero-padded, and transformed by a fast Fourier transform (FFT) into the frequency domain before fitting the data. Accordingly, to fit the data in the frequency domain, Equation 3 becomes Equation 4 in the frequency domain:

$$\tilde{P}_m(f) = P_{wm}(f) + \sum_{i=1}^{N} P_{ai}(f)\exp(j2\pi f \tau_{im}) + E_m(f) \quad (4)$$

Generally, the number and magnitude of acoustic transient sources present and the extent of the wind noise present is not known before acquiring data with the array 600. Therefore, estimating the parameters (i.e., the velocity vectors and pressure signals) may be accomplished by performing several statistical methods, and then selecting the method that has the best model comparison measure, such as the Akaike Information Criterion. For example, variable projection methods may improve the rate of convergence to determining optimal estimated parameter values.

Further, in at least some embodiments, the values of the estimated pressure signals do not need to be retained during the estimation process, reducing the number of unknowns in the model. The end result of the estimation process performed by processor 715 is a determination of the mean wind vector, and the direction of travel vectors (including speed) of all acoustic signals. The processor 715 also determines estimates of acoustic signals present at the entire array and the pressure signals (as given in Equation 1) associated with the local mean wind noise at each of the subarrays 602.

To test the ability of array 600 to accurately detect wind noise signals and acoustic signals, data was collected using one subarray 602 of microphones 104. To simulate the two-scale array 600, different brief time segments of recorded wind noise were extracted from a one minute recording and the overall array 600 was configured to appear as shown in FIG. 6, with the synthetic wind noise signal coming from the direction indicated in FIG. 6. A synthetic one cycle acoustic pulse of a 40 Hz sine wave was added to all sixteen channels, and appropriately delayed as to appear as an acoustic plane wave travelling in the direction indicated in FIG. 6.

Figure 8B:
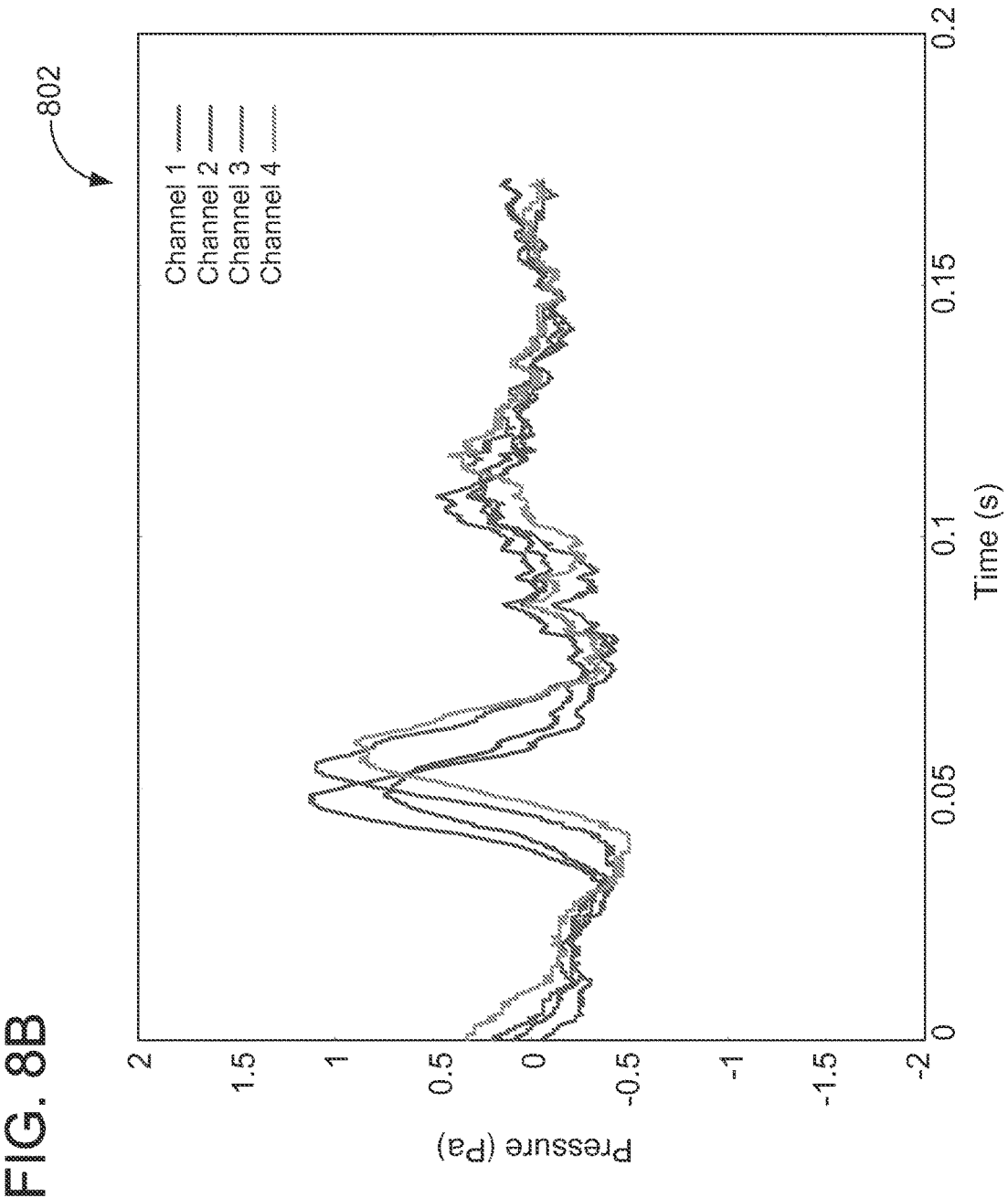

FIG. 8A is a graph 800 illustrating the pressure on four microphones 104 in one subarray 602 without the synthetic acoustic signal (i.e., the 40 Hz pulse), and FIG. 8B is a graph 802 illustrating the pressure on four microphones 104 in one subarray 602 with the synthetic acoustic signal. Both graphs 800 and 802 plot pressure versus time. As demonstrated by comparing FIG. 8A with FIG. 8B, from the raw data acquired by the microphones 104, the presence of the 40 Hz acoustic signal is not obvious.

Figure 9:
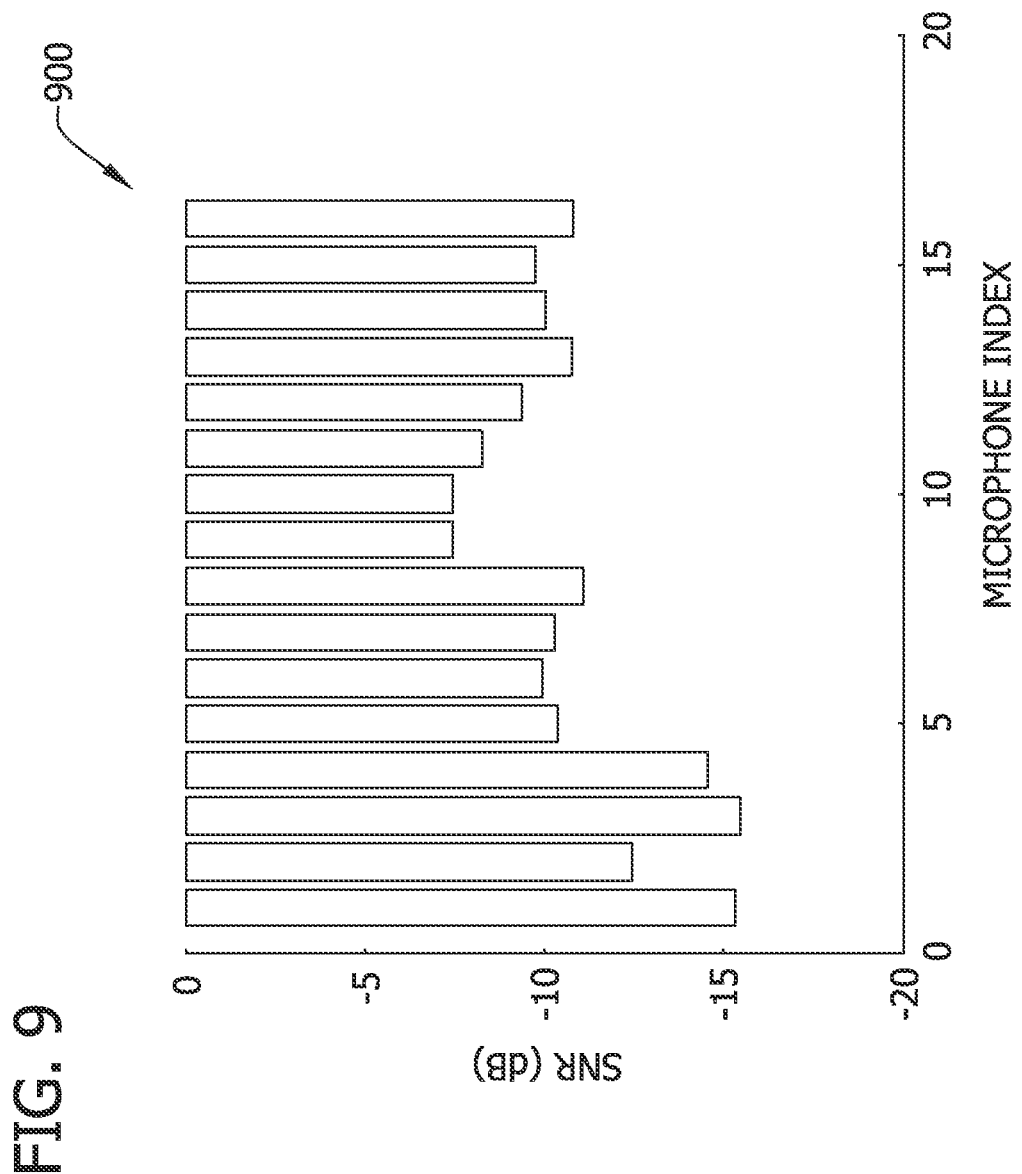
FIG. 9 is a graph of signal-to-noise ratio for microphones in the two-scale array shown in FIG. 6.

FIG. 9 is a graph 900 of the SNR for each of the sixteen microphones 104. Specifically graph 900 plots SNR in decibels (dB) versus the microphone index. For the experiment, the processor 715 was programmed to seek acoustic signals in the range of 20 Hz to 200 Hz, but no assumptions were made concerning the number, duration, or shapes of the acoustic signals to be detected. Further, the mean wind speed was constrained to less than 10 meters per second (m/s) and the local speed of sound was constrained to between 330 m/s and 350 m/s. Using this setup, pressure pulse data was acquired by the microphones 104, transmitted to the computing device 700, and processed using the processor 715, as described above. Accordingly, processor 715 fit the received pressure pulse data to Equation 4 to determine estimates of the velocity vectors and pressure signals for wind noise and acoustic signals.

Figure 10:
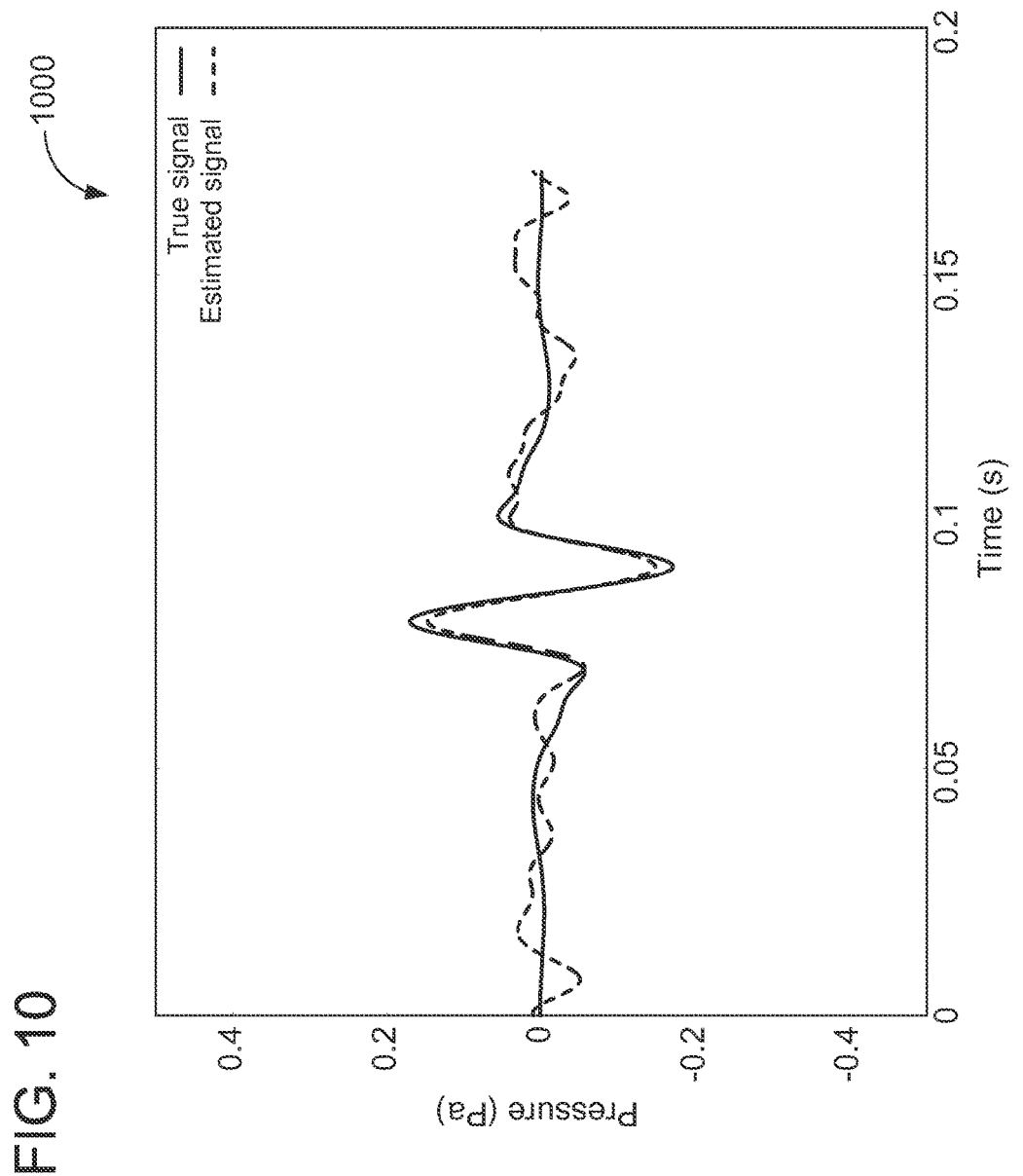
FIG. 10 is a graph comparing an actual synthetic pulse to an synthetic pulse estimated using the two-scale array shown in FIG. 6.

FIG. 10 is a graph 1000 comparing the actual synthetic acoustic pulse and the acoustic pulse estimated using the array 600 and the computing device 700. The graph 1000 plots pressure in Pa versus time. As demonstrated by the graph 1000, the estimate determined by the processer 715 is a relatively close to the actual synthetic acoustic signal. Notably, a peak of cross-correlation of the filtered (20 Hz to 200 Hz) residuals was less than 0.2 for all pairs, and the maximum of normalized autocorrelations (other than lag by 0) was 0.1. This indicates that most of correlated energy (i.e., the wind noise) was removed from the measured data, and that the part of the wind noise not removed is nearly white noise.

For comparison, a known broadband beamformer system (not shown) was used to acquire the same acoustic data under similar conditions. Specifically, the broadband beamformer system was configured to acquire data in the same frequency range, using a square array. Further, the SNRs were approximately the same as in the array 600, and the microphones in the broadband beamformer system were positioned far enough apart to ensure that wind noise was uncorrelated among the respective channels. The data acquired by the broadband beamformer system was processed using known methods to produce an estimated acoustic signal.

Figure 11:
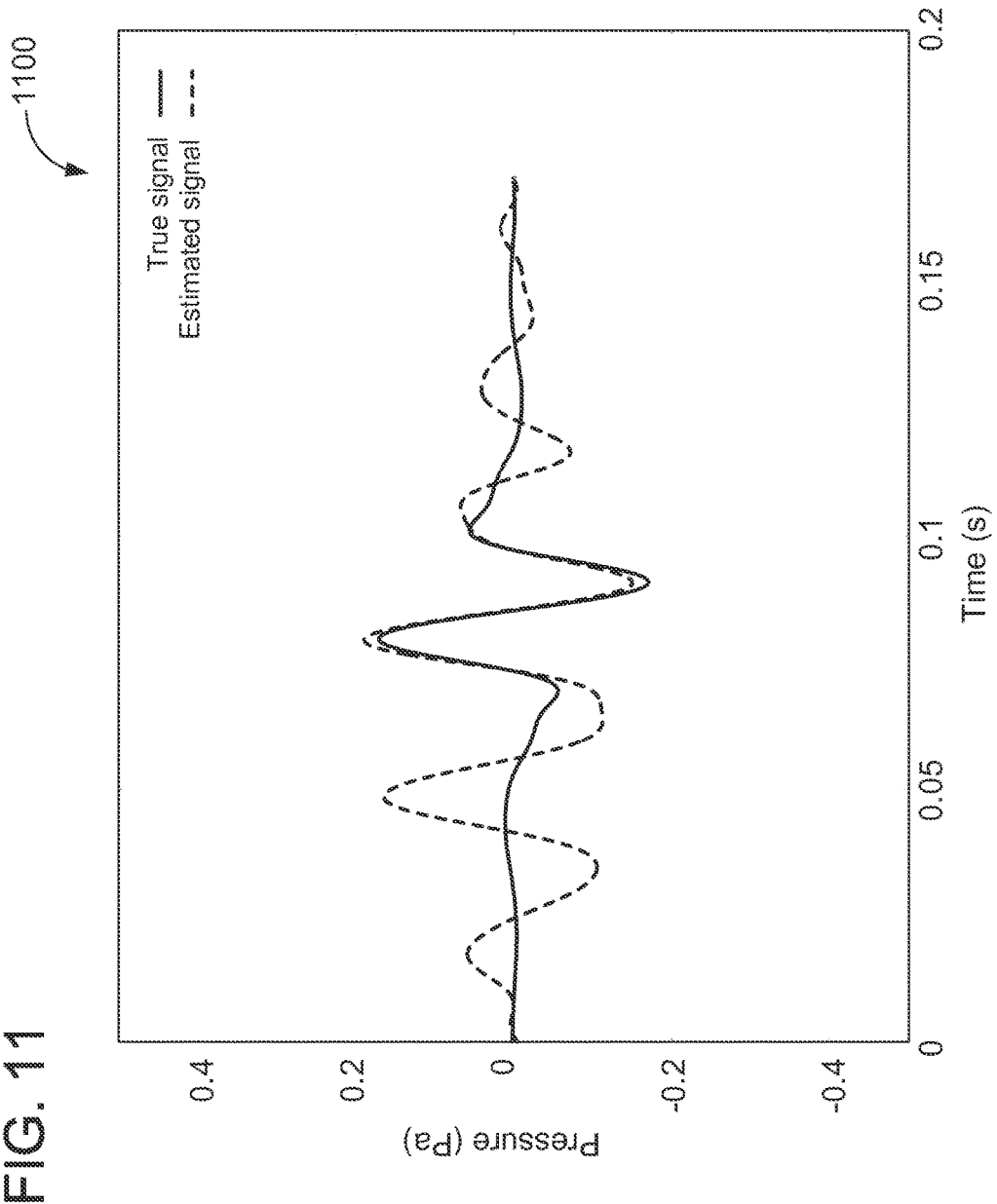
FIG. 11 is a graph comparing an actual synthetic pulse to a synthetic pulse estimated using a broadband beamformer system.

FIG. 11 is a graph 1100 comparing the actual synthetic acoustic pulse to the estimated acoustic pulse produced by a known broadband beamformer system. The graph 1100 plots pressure in Pa versus time. By comparing FIGS. 10 and 11, it is apparent that the estimated acoustic signal produced according to the embodiments described herein is more accurate than the estimated acoustic signal produced by the known broad beamformer system. Accordingly, the methods and systems described herein are capable of more accurately estimating acoustic signals in the presence of wind noise.

An assembly kit may be provided for assembling a system for detecting wind noise signals and acoustic signals in accordance with the embodiments described herein. In the exemplary embodiment, the assembly kit includes a plurality of microphones, such as microphones 104 (shown in FIGS. 1 and 6), and a processing device, such as processor 715 and/or computing device 700 (both shown in FIG. 7). The assembly kit also includes a guide with instructions on how to assemble the system in accordance with the embodiments described herein. For example, the guide may include instructions for positioning the microphones in an array, such as two-scale array 600 (shown in FIG. 6). The guide may be a printed manual and/or pamphlet, an audio and/or visual guide, an electronic guide accessible through the use of a computing device, and/or any other suitable item for providing instructions to a user. Accordingly, using the components provided in the assembly kit, the user may assemble a system for detecting wind noise signals and acoustic signals.

The embodiments described herein utilize a mathematical model to determine wind noise correlation without knowing or directly estimating wind noise correlation before acquiring data. The mathematical model includes terms representing wind noise signals and terms representing acoustic signals. By fitting acquired data to the mathematical model, wind noise signals and acoustic signals are separated from each other, and an estimate of any acoustic signals is produced. Notably, rather than trying to avoid wind noise correlation by increasing spacing between microphones, the systems and methods described herein improve SNR by reducing the spacing between microphones so that wind noise correlation is actually increased. Moreover, the systems and methods described herein may be implemented on mobile platforms, such as vehicles.

A technical effect of the systems and methods described herein includes at least one of: (a) receiving pressure pulse data from a plurality of microphones; (b) fitting the pressure pulse data from each microphone to a parametric model that includes a term representing pressure pulses due to wind noise signals and a term representing pressure pulses due to acoustic signals; and (c) estimating, based on the fitting of the pressure pulse data, a pressure and a velocity of at least one wind noise signal in the pressure pulse data and a pressure and a velocity of at least one acoustic signal in the pressure pulse data.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computing device for processing wind noise signals and acoustic signals, the computing device comprising:

a communication interface configured to receive pressure pulse data from a plurality of microphones;

a memory device configured to store the received pressure pulse data; and a processor configured to:

fit the pressure pulse data from each microphone to a parametric model that includes a term representing pressure pulses due to wind noise signals and a term representing pressure pulses due to acoustic signals;

estimate, based on the fitting of the pressure pulse data, a pressure and a velocity of at least one wind noise signal in the pressure pulse data and a pressure and a velocity of at least one acoustic signal in the pressure pulse data; and output the estimated pressures and velocities for the at least one wind noise signal and the at least one acoustic signal.

2. A computing device according to claim 1, wherein the processor is further configured to transform the pressure pulse data from the time domain into the frequency domain prior to fitting the pressure pulse data.

3. A computing device according to claim 1, wherein the processor is configured to fit the pressure pulse data from each microphone to a parametric model that accounts for pressure fluctuations in wind noise along a flow direction of wind and transverse to the flow direction of wind.

4. A computing device according to claim 1, wherein the communication interface is configured to receive pressure pulse data from a plurality of microphones in an array that includes a plurality of subarrays of microphones, wherein the subarrays are spaced apart from one another such that the subarrays are configured to detect acoustic signals, and wherein microphones in each subarray are positioned proximate one another such that wind noise signals are correlated between the microphones in each subarray.

5. A computing device according to claim 1, wherein the communication interface is configured to receive pressure pulse data from four subarrays that each include four microphones.

6. A computing device according to claim 1, wherein to receive pressure pulse data from a plurality of microphones, the communication interface is configured to receive a set of pressure pulse data from each microphone, and wherein to fit the pressure pulse data, the processor is configured to fit each set of pressure pulse data to a separate instance of the parametric model.

7. A method for processing wind noise signals and acoustic signals, the method comprising:

receiving, at a processor, pressure pulse data from a plurality of microphones;

fitting, using the processor, the pressure pulse data from each microphone to a parametric model that includes a term representing pressure pulses due to wind noise signals and a term representing pressure pulses due to acoustic signals;

estimating, using the processor, based on the fitting of the pressure pulse data, a pressure and a velocity of at least one wind noise signal in the pressure pulse data and a pressure and a velocity of at least one acoustic signal in the pressure pulse data; and outputting the estimated pressures and velocities for the at least one wind noise signal and the at least one acoustic signal.

8. A method according to claim 7, further comprising transforming the pressure pulse data from the time domain into the frequency domain prior to fitting the pressure pulse data to the parametric model.

9. A method according to claim 7, wherein fitting the pressure pulse data comprises fitting the pressure pulse data to a parametric model that accounts for pressure fluctuations in wind noise along a flow direction of wind and transverse to the flow direction of wind.

10. A method according to claim 7, wherein receiving pressure pulse data comprises receiving pressure pulse data from a plurality of microphones in an array that includes a plurality of subarrays of microphones, wherein the subarrays are spaced apart from one another such that the subarrays are configured to detect acoustic signals, and wherein microphones in each subarray are located close enough to one another such that wind noise signals are correlated between the microphones in each subarray.

11. A method according to claim 7, wherein receiving pressure pulse data comprises receiving pressure pulse data from four subarrays that each include four microphones.

* * * * *